(12) United States Patent
Lucas

(10) Patent No.: US 7,741,798 B2
(45) Date of Patent: Jun. 22, 2010

(54) RFI/EMI FILTER FOR VARIABLE FREQUENCY MOTOR DRIVE SYSTEM

(75) Inventor: Donald J. Lucas, Stoneham, MA (US)

(73) Assignee: Azure Dynamics, Inc., Woburn, MA (US)

( * ) Notice: Subject to any disclaimer, the term of this patent is extended or adjusted under 35 U.S.C. 154(b) by 391 days.

(21) Appl. No.: 11/985,664

(22) Filed: Nov. 16, 2007

(65) Prior Publication Data

US 2008/0143285 A1 Jun. 19, 2008

Related U.S. Application Data

(60) Provisional application No. 60/860,412, filed on Nov. 21, 2006.

(51) Int. Cl.
H02P 6/00 (2006.01)
(52) U.S. Cl. .............................. 318/400.24; 318/400.25; 318/811
(58) Field of Classification Search ............ 318/400.24, 318/400.25, 811, 375; 333/12; 343/713, 343/792
See application file for complete search history.

(56) References Cited

U.S. PATENT DOCUMENTS

| | | | |
|---|---|---|---|
| 5,091,797 A * | 2/1992 | Proebster | 398/197 |
| 5,784,236 A | 7/1998 | Tardiff et al. | |
| 6,028,405 A | 2/2000 | Kume et al. | |
| 6,242,883 B1 | 6/2001 | Strunk | |
| 6,354,879 B1 | 3/2002 | Plehaty | |
| 6,648,994 B2 | 11/2003 | Sunakawa et al. | |
| 6,710,673 B1 | 3/2004 | Jokerst | |
| 6,903,277 B2 | 6/2005 | Whidden | |
| 7,053,850 B1 * | 5/2006 | Bogdans et al. | 343/792 |

OTHER PUBLICATIONS

G. Skibinski, et al., "Generation, Control and Regulation of EMI from AC Drive", IEEE 1/1997 07803-4070, 1997 (13 pages total).
G. Skibinski, et al., "EMI Emissions of Modern PWM ac Drives", IEEE Industry Applications Magazine Nov./Dec. 1999, pp. 47-81.

* cited by examiner

Primary Examiner—Karen Masih
(74) Attorney, Agent, or Firm—Iandiorio Teska & Coleman

(57) ABSTRACT

An RFI/EMI filter for a variable frequency motor drive system includes a variable frequency drive; a common mode choke; a motor; a cable including a plurality of power leads interconnecting the motor with the variable frequency drive and passing through the choke; a ground shield surrounding the cable and connected to motor ground and variable frequency drive ground; and a common mode return conductor interconnected between the variable frequency drive and the motor and disposed within the shield and passing through the choke for returning a portion of the common mode current to cancel a portion of the saturation current experienced by the choke to increase the portion of the common mode current carried by the return conductor and decrease the portion carried by the shield to reduce the RFI/EMI contributed by the shield.

16 Claims, 2 Drawing Sheets

RFI/EMI FILTER FOR VARIABLE FREQUENCY MOTOR DRIVE SYSTEM

RELATED APPLICATIONS

This application claims benefit of and priority to U.S. Provisional Application Ser. No. 60/860,412 filed Nov. 21, 2006 incorporated herein by this reference.

FIELD OF THE INVENTION

This invention relates to an RFI/EMI filter for a variable frequency motor drive system.

BACKGROUND OF THE INVENTION

Variable frequency drive (VFD) inverters produce pulse width modulated (PWM) high voltage waveforms delineated over power leads to control variable frequency motors in order to control torque, speed, position, etc. The motor electrical frequency is modulated at a much higher rate using pulse width modulation techniques. For a typical electrical frequency of 0 to 600 Hz, the typical inverter modulates the output voltage waveform at 5 to 50 times the output frequency, or in the range of 3 kHz to 30 kHz. This modulation frequency goes by different names, but many sources refer to it as a "carrier" frequency. Historically, this carrier frequency has a very high dV/dt, or edge frequency content, much higher than the motor's electrical frequency or the inverter's carrier frequency. If this edge rate is reduced, then the inverter will dissipate more wasted energy in the form of a temperature rise so the edge rate is usually as high as it can be tolerated in order to keep the wasted energy to a minimum.

Unfortunately, high edge rates in the carrier waveform produce harmful, damaging, or otherwise objectionable levels of Electro-Magnetic Interference, or EMI. Sometimes, this is also referred to as Radio Frequency Interference, or RFI, when the edge rate produces disturbances in the frequency band occupied by commercial, military, or private radio frequency bands.

The RFI/EMI is the result of a parasitic voltage generator constituted by the parasitic capacitance between the power transistor and the heat sink in the VFD, for example. There is also a parasitic load formed by the wire insulation dielectric and the motor cage (motor ground), for example. In one approach to this problem a common mode or current compensated choke is used to magnetically couple the two or more phase windings in the power leads between the VFD and motor. If the currents in the phase windings are balanced and cancel, the choke offers no impedance. But if a parasitic current occurs, unbalancing that cancellation, the choke presents an impedance and suppresses at least a portion of the parasitic current flow in the primary or leakage galvanic paths between the motor and VFD such as through a vehicle chassis frame or concrete floor which gives rise to the RFI/EMI. One approach to this problem is to surround the power leads with a metallic shield such as a tinned copper braid, a solid steel or aluminum electrical conduit, or some other electrical shielding method. As long as this shield does not conduct any current, it will not produce an electric or magnetic field. This need to have no current in the shield is rarely or never met for physical reasons and thus engineers focus on simply reducing the currents to an acceptable level.

However, the shield itself is a good conductor of the parasitic current and becomes a radiator of the undesirable RFI/EMI. This is so in part because the structure of the shield generally has a large surface area and is a good conductor of higher frequencies. One solution to this new problem was to add a secondary internal shield about the power leads but within the primary shield. The inner secondary shield conducts a portion of the parasitic current and the resulting RFI/EMI is shielded by the output primary shield but the outer primary shield still acts as a radiator of the remaining portion of the unwanted RFI/EMI. In addition, shields are expensive and a second one significantly increases the cost.

More recently an improvement in the core material for the choke, nanocrystalline amorphous material, has made the suppression of the parasitic current more critical. For example, that material comes in different forms. One producer, Hitachi Metals, produces two forms. One form, 3 KM, has a high permeability of 70K Gauss/Oersted (CGS) but a lower saturation level and another form, 3 KL, has a lower permeability of 55K Gauss/Oersted but a higher saturation level. This makes the parasitic current a further problem.

While it would be desirable to use the 3 KM, 70K Gauss/Oersted permeability material, there is not much margin for safety in the saturation level and an unbalanced condition might well occur putting the choke into saturation and rendering it useless as a common mode choke. Using the other material, 3 KL, of 55K Gauss/Oersted permeability gains the safety of a higher saturation level but the permeability is lower than the 3 KM material and costs more.

SUMMARY OF THE INVENTION

It is therefore an object of this invention to provide an improved RFI/EMI filter for a variable frequency drive motor system.

It is a further object of this invention to provide such an improved RFI/EMI filter for a variable frequency drive motor system which permits use of higher permeability but lower saturation level common mode choke cores.

It is a further object of this invention to provide such an improved RFI/EMI filter for a variable frequency drive motor system which is smaller, lighter in weight and lower cost.

It is a further object of this invention to provide such an improved RFI/EMI filter for a variable frequency drive motor system which reduces RFI/EMI emissions from undesirable paths, e.g. cable shield, concrete floors, vehicle chassis.

The invention results from the realization that a more effective RFI/EMI filter for a variable frequency motor drive system can be achieved with a common mode return conductor interconnecting the motor ground and its variable frequency drive ground, and disposed within the power lead shield and passing through the common mode choke for returning a portion of the common mode current to cancel a portion of the saturation current experienced by the choke to increase the portion of the common mode current carried by the return conductor and decrease the portion carried by the shield to reduce the RFI/EMI contributed by the shield and further enabling use of smaller, lighter cores with higher permeability such as those using nanocrystalline amorphous core material.

The subject invention, however, in other embodiments, need not achieve all these objectives and the claims hereof should not be limited to structures or methods capable of achieving these objectives.

This invention features An RFI/EMI filter for a variable frequency motor drive system including a variable frequency drive, a common mode choke, a motor, a cable including a plurality of power leads interconnecting the motor with the variable frequency drive and passing through the choke. A ground shield surrounds the cable and is connected to motor ground and variable frequency drive ground A common mode return conductor is interconnected between the variable frequency drive and the motor and is disposed within the shield and passes through the choke for returning a portion of the common mode current to cancel a portion of the saturation current experienced by the choke to increase the portion of the common mode current carried by the return conductor and decrease the portion carried by the shield to reduce the RFI/EMI contributed by the shield.

In a preferred embodiment the variable frequency drive may have a neutral and one output phase. The variable frequency drive may have a neutral and two output phases. The variable frequency drive may have three output phases. The common mode choke may include a high permeability material. The high permeability material may have a permeability of greater than 25000 Gauss/Oersted. The common mode choke material may be made of a nanocrystalline amorphous material. The motor may be a multiphase motor. The cable may include two leads. The cable may include three leads. The shield may include a woven conductor material. The shield may include a single shield device surrounding all the power leads. The shield may include a plurality of shield devices one surrounding each power lead and the common mode return conductor. The common mode return conductor may include a single return lead. The common mode return conductor may include a plurality of return leads.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
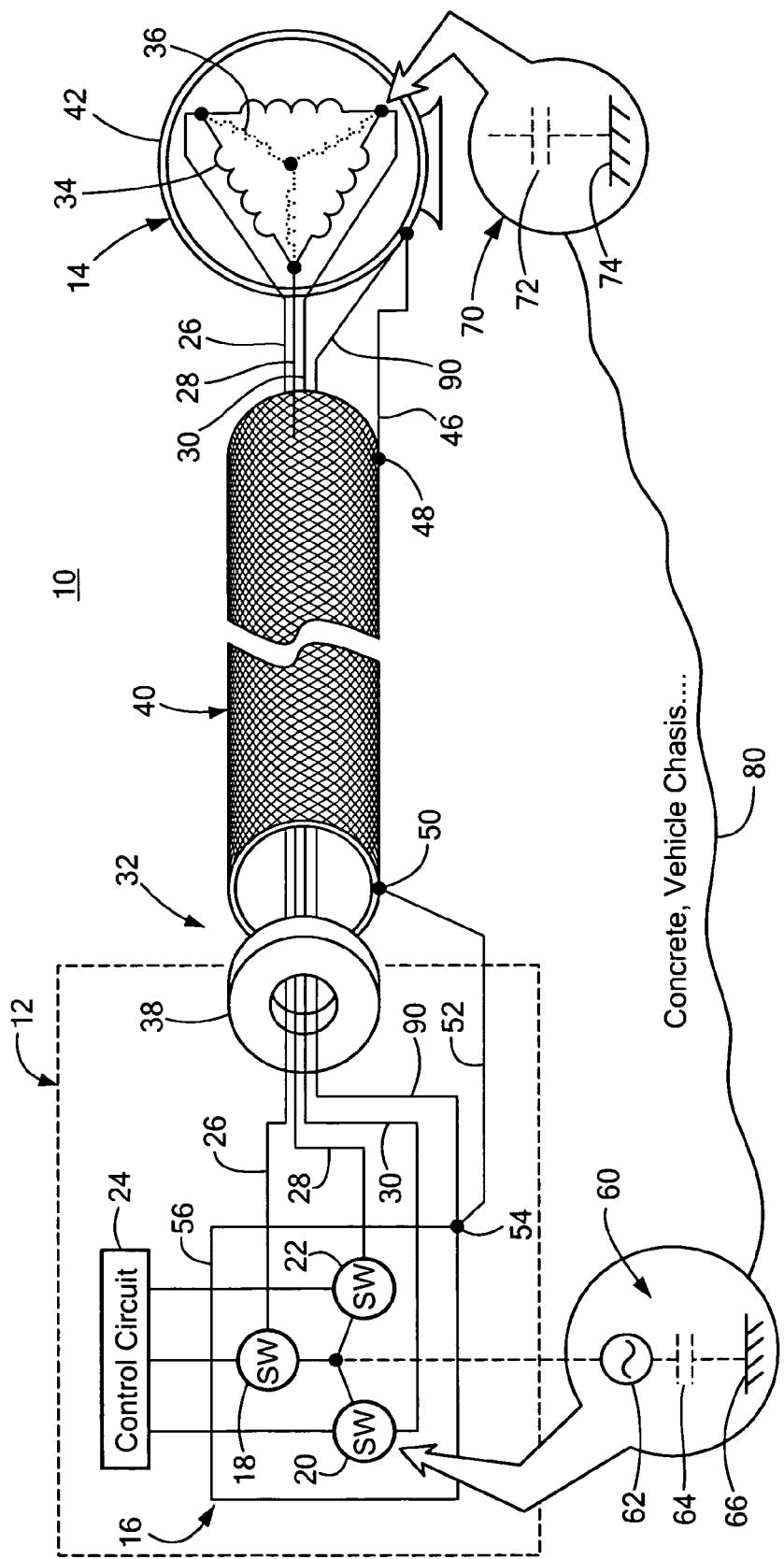
FIG. 1 is a schematic diagram of a variable frequency motor drive system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 an RFI/EMI filter for a variable frequency motor drive system 10 according to this invention which includes a variable frequency drive (VFD) 12 which drives a motor 14 in the conventional way. VFD 12 typically includes a switching circuit 16 including for example three switches 18, 20, and 22, such as insulated gate bipolar transistors (IGBT) which, when operated by control circuit 24, invert d.c. power to a.c. power and provide that power over three power leads 26, 28 and 30 in cable 32. These leads 26, 28, 30 could be configured to function as a neutral and one power phase, two power phases with or without a neutral, three power phases or any other number of phases by adding more leads. Motor 14 can be any multiphase motor. For example it can be delta connected as shown at 34 or Y connected as shown in phantom at 36 or both or it can be in any other suitable configuration. Here motor 14 is shown as a three phase motor and VFD 12 provides suitable switching 18, 20, 22 to provide a three phase power output on power leads 26, 28 and 30. It should be understood that VFD 12 could provide a single phase plus a neutral, two phases or any suitable configuration needed to serve motor 14. Power leads 26, 28 and 30 pass through a common mode or current compensated choke 38 which in this preferred embodiment would be made of a nanocrystalline amorphous material which features lower cost and higher permeability. Power leads 26, 28 and 30 also pass through common mode choke 38 and then through a ground shield 40 which is connected to the cage 42 of motor 14 at 44 via a line 46 which is connected at 48 to one end of shield 40. Shield 40 may include a woven conductor material of copper or aluminum for example. The other end of shield 40 is connected at 50 to line 52 which is connected to point 54 which is typically on the heat sink 56 on which are mounted switches 18, 20, and 22 in VFD 12. Common mode choke 38 is shown disposed in VFD 12 but it need not be.

In operation, control circuit 24 operates switches 18, 20, and 22 in sequence to invert the d.c. power to three phase a.c. power on power leads 26, 28, and 30 which are connected over cable 32 through shield 40 to motor 14. Ideally, all of the current flowing through power leads 26, 28, and 30 through common mode choke 38 in cable 32 returns through choke 38 so all of the currents cancel and there is no differential current that would contribute to saturating choke 38. However, in reality there is a parasitic voltage generator 60 indicated in phantom by voltage generator 62 and capacitor 64 connected to ground 66 which is formed by the structure itself e.g. the parasitic capacitance between the switches 18, 20, 22 and heat sink 56. The voltage generated by this parasitic voltage generator 60 causes the entire output on power leads 26, 28, and 30 to move up and down in voltage. The voltage between the power leads 26, 28, and 30 does not change but the entire voltage level is shifted. This induces a spurious current through power leads 26, 28, and 30 through choke 38. However, this spurious current is not canceled or balanced for there occurs a parasitic capacitive load indicated at 70, represented by capacitor 72 connected to ground 74, which is formed e.g. by the wire insulation dielectric and the motor cage. Thus the spurious current generated by the parasitic voltage generator 60 passes through load 70 and back through an undesired path such as concrete or vehicle chassis and does not pass back through common mode choke 38. Some of the spurious current, most of it it is intended, passes through shield 40 which reduces the amount of the current flowing through the undesirable path 80 and the concomitant RFI/EMI emissions. However, now the shield 40 receives more of that spurious current, and it too becomes a radiator of the unwanted RFI/EMI. Further, the unbalanced currents result in a differential current that moves choke 38 closer to saturation. This is a particular problem where the choke as is desired in this embodiment, uses a material which has a very high permeability e.g. 25,000 Gauss/Oersted or greater such as a nanocrystalline amorphous material which has a very small margin of safety with respect to its saturation level in this situation.

In accordance with this invention both problems can be addressed and reduced by the use of a common mode return conductor 90, which is connected to the same point 54 on heat sink 65 in VFD 12 as shield 40 and to the sink point 44 on motor 14, cage 42. This common mode return conductor passes through shield 40 so that any RFI/EMI emitted by common mode return conductor 90 will be shielded by shield 40. In addition it also passes through common mode choke 38. The return of some of the spurious current through common mode return conductor 90 passing through choke 38 reduces the saturation current and moves the choke away from the saturation level. While initially most of the spurious current will return through shield 40 instead of the undesirable path 80 or common mode return conductor 90, as the frequency increases the impedance of core 38 increases making common mode return conductor 90 conduct more and shield 40 conduct less. This enhances the balancing of the spurious current through choke 38 pulling it even farther from saturation level and reduces the current through shield 40 and the concomitant RFI/EMI emission.

Figure 2:
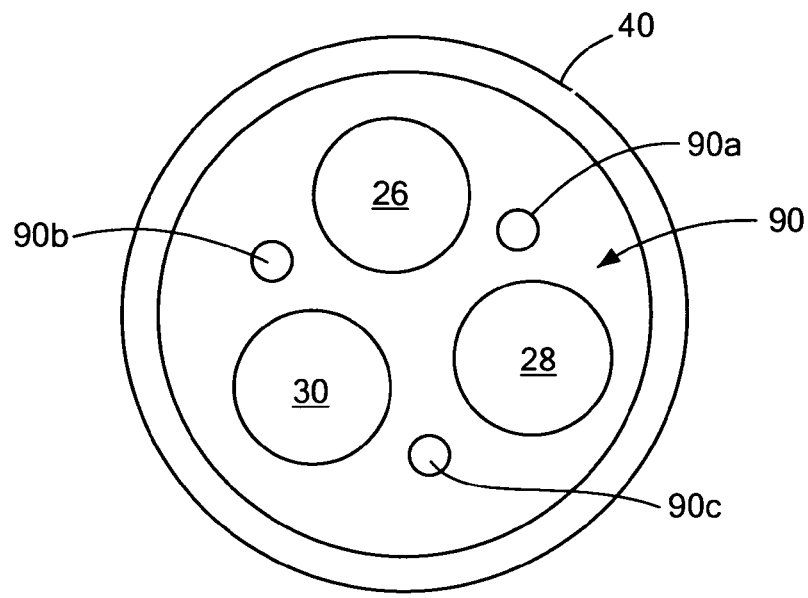
FIG. 2 is a schematic cross-sectional view of a cable with the common mode return conductor implemented with more than one lead.
Figure 3:
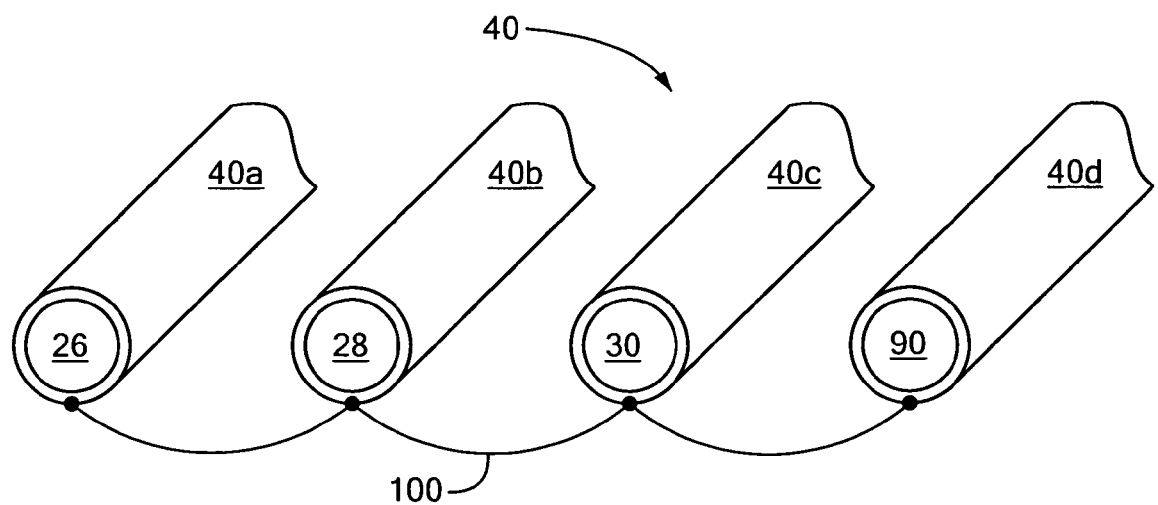
FIG. 3 is a schematic three dimensional, cross-sectional view of a cable with the shield implemented with a number of shield devices one covering each power lead and return lead.

Although thus far common mode return conductor 90 is shown as a single lead this is not a necessary limitation of the invention. As shown in FIG. 2 common mode return conductor 90 may include two or more or a plurality, for example three leads 90a, 90b, 90c which together constitute the common mode return 90 conductor and are all connected to the same points 54 and 44. Further, although each of the power leads, 26, 28, and 30 in common mode return conductor 90 are shown surrounded by a single shield 40 this is not a necessary limitation either. For example, as shown in FIG. 3, shield 40 may actually include a number of individual shields, 40a, 40b, 40c, 40d, each of which surrounds or shields one of the power leads 26, 28 30, and common mode return conductors 90 which shields would be electrically connected together as shown at 100.

Although specific features of the invention are shown in some drawings and not in others, this is for convenience only as each feature may be combined with any or all of the other features in accordance with the invention. The words "including", "comprising", "having", and "with", as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An RFI/EMI filter for a variable frequency motor drive system comprising:
    a variable frequency drive;
    a common mode choke;
    a motor;
    a cable including a plurality of power leads interconnecting said motor with said variable frequency drive and passing through said choke;
    a ground shield surrounding said cable and connected to motor ground and variable frequency drive ground; and
    a common mode return conductor interconnected between said variable frequency drive and said motor and disposed within said shield and passing through said choke for returning a portion of the common mode current to cancel a portion of the saturation current experienced by said choke to increase the portion of the common mode current carried by said return conductor and decrease the portion carried by said shield to reduce the RFI/EMI contributed by said shield.

2. The RFI/EMI filter of claim 1 in which said variable frequency drive has three output phases.

3. The RFI/EMI filter of claim 1 in which said variable frequency drive has a neutral and a single output phase.

4. The RFI/EMI filter of claim 1 in which said variable frequency drive has a neutral and has two output phases.

5. The RFI/EMI filter of claim 1 in which said variable frequency drive has a neutral and has three output phases.

6. The RFI/EMI filter of claim 1 in which said common mode choke includes a high permeability material.

7. The RFI/EMI filter of claim 6 in which said high permeability material has a permeability of greater than 25000 Gauss/Oersted.

8. The RFI/EMI filter of claim 6 in which said common mode choke includes a nanocrystalline amorphous material.

9. The RFI/EMI filter of claim 1 in which said motor is a multiphase motor.

10. The RFI/EMI filter of claim 1 in which said cable includes two leads.

11. The RFI/EMI filter of claim 1 in which said cable includes three leads.

12. The RFI/EMI filter of claim 1 in which said shield includes a woven conductor material 13. The RFI(EMI filter of claim 1 in which said shield includes a single shield device surrounding all said power leads.

14. The RFI/EMI filter of claim 1 in which said shield includes a plurality of shield devices one surrounding each said power lead and said common mode return conductor.

15. The RFI/EMI filter of claim 1 in which said common mode return conductor includes a single return lead.

16. The RFI/EMI filter of claim 1 in which said common mode return conductor includes a plurality of return leads.

* * * * *